Figure 1:
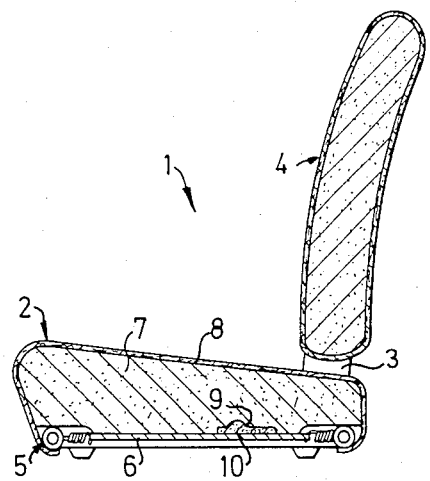

United States Patent [19]

Sperr

[11] Patent Number: 4,637,651
[45] Date of Patent: Jan. 20, 1987

[54] SEAT PLATE

[75] Inventor: Gustaf A. Sperr, Trollhättan, Sweden

[73] Assignee: Saab-Scania Aktiebolag, Sodertalje, Sweden

[21] Appl. No.: 719,277
[22] PCT Filed: Aug. 7, 1984
[86] PCT No.: PCT/SE84/00270
  § 371 Date: Apr. 4, 1985
  § 102(e) Date: Apr. 4, 1985
[87] PCT Pub. No.: WO85/00735
  PCT Pub. Date: Feb. 28, 1985

[30] Foreign Application Priority Data

Aug. 10, 1983 [SE] Sweden .............................. 83043471

[51] Int. Cl.⁴ .................................................. A47C 7/02
[52] U.S. Cl. ................................... 297/458; 297/455; 297/459
[58] Field of Search .............. 297/284, 452, 455, 456, 297/458, 459; 5/446, 447

[56] References Cited

U.S. PATENT DOCUMENTS

| 1,455,234 | 5/1923 | Thompson | 297/459 |
| 2,769,185 | 11/1956 | Biederman | 5/436 |
| 3,177,036 | 4/1965 | Halter | 297/454 |
| 3,205,010 | 9/1965 | Schick | 297/458 X |
| 3,376,070 | 4/1968 | Johnson | 297/459 |
| 3,463,547 | 8/1969 | Brennan et al. | 297/459 |
| 3,495,871 | 2/1970 | Resag et al. | 297/284 |
| 3,503,649 | 3/1970 | Johnson | 297/459 |
| 3,749,442 | 7/1973 | Berg et al. | 297/458 X |
| 3,751,111 | 8/1973 | Taylor et al. | 297/457 X |

FOREIGN PATENT DOCUMENTS

| 118082 | 11/1969 | Norway . |
| 201402 | 2/1966 | Sweden . |
| 336438 | 7/1971 | Sweden . |

Primary Examiner—Francis K. Zugel
Assistant Examiner—Peter R. Brown
Attorney, Agent, or Firm—Cushman, Darby & Cushman

[57] ABSTRACT

Seat plate (10) for supporting the pelvis of a person sitting in a seat (2), e.g. a seat in a vehicle. Known seat implementations only give limited support in a horizontal direction. This causes a noticeable problem in vehicle seats, since a person sitting on one is subjected to accelerations and retardations in both longitudinal and transverse directions. The muscles which are activated in such cases become tired relatively quickly, often resulting in that an incorrect sitting attitude is assumed which can give rise to skew loads as well as accelerating and amplifying the sense of tiredness and soreness. The invention relates to a seat plate (10) for positioning the pelvis of a sitting person so that no notable muscular work is required for maintaiing a correct sitting attitude. The seat plate (10) is thus formed with two raised, scythe-like ridges (11) each including a forward transverse ridge portion (13) and a longitudinal ridge portion (14) extending backwords from the transverse portion (13). Valleys (16), formed between the ridge portions (13,14), position both seat bone protutuberances of the pelvis against gliding forwards as well as laterally.

8 Claims, 4 Drawing Figures

SEAT PLATE

The present invention relates to a seat plate for supporting the pelvis of a person sitting on a seat, e.g. a vehicle seat.

To enable comfortable sitting attitudes in vehicles and in furniture for sitting, it is generally known to form seats for persons with soft and elastic upholstery. In an unloaded state, such a seat usually assumes a substantially smooth surface, while under the load of a person it accommodates its shape after the contours with which the person in question loads the seat. This results in that the weight of the person is taken up by a comparatively large contact area. However, there is no notable support for the person in a horizontal direction, with the result that the person must activate certain muscles in order to sit in an upright attitude. Such a sitting attitude is however not possible to maintain for a long time, since the muscles tire rapidly.

In seats with back supports it is common for a person sitting on one to sit leaning somewhat backwards. However, this results in that the pelvis successively glides forward and/or causes rotation of the pelvis about a horizontal axis. This rotation takes place substantially about an imagined axis extending through the joints of the hip-bone in the pelvis, to give rise to what is usually called "pelvis rotation".

The problems mentioned result in that the skeleton and musculature of the sitting person are subjected to skew loads. The consequence is feelings of discomfort which usually occur in the form of tiredness and soreness.

The above-mentioned problems are particularly salient in vehicle seats, since a person sitting on such a seat is subjected to alternating accelerations and retardations during travel. Furthermore, such a person is also subjected to lateral forces striving to laterally displace the pelvis and to turn the pelvis about a vertical axis.

There are also similar problems for people in wheelchairs, who are often compelled to sit for long periods in an unaltered attitude.

With the intention of solving the above-mentioned problems, it is known to form the sitting portion of such seats with a U-shaped depression having the legs of the U directed forwards. Such a depression is intended to support the pelvis and to prevent its sliding forwards by having the pubic bone of the person being supported against a forward protuberance. However, this is a drawback since at least male persons experience this implementation as directly uncomfortable. Neither does the U-shaped depression prevent rotation of the pelvis, with the consequence that skew loads also occur. The U-shaped depression is defined laterally by raised edges, which give rise to high contact pressures, inter alia, on the sciatic nerves. This results in that the legs are subjected to discomfort in the form of numbness and sensations of cold.

The present invention has the object of forming a seat plate positioning the pelvis better than known solutions both with respect to gliding and to turning, without causing high contact pressure against nerves or muscles. In this respect the invention is distinguished substantially in that the seat plate is formed on its upper side with two raised scythe-shaped ridges, symmetrically situated relative a longitudinal centre line, and in that each ridge includes a substantially transverse ridge portion which extends outwards and curves slightly backwards, and a substantially longitudinal ridge portion which extends backwards and slightly curves outwards, the ridges being contoured to support the seat bone protuberances of the pelvis substantially on their forward and inner sides.

A seat plate formed in accordance with the invention positions the pelvis in all directions by the seat bone protuberances resting against the mentioned ridges on the seat plate. The seat bone protuberances are the lower parts of the hip-bone on which the pelvis rests when a person sits on a flat, hard substructure. The centre-to-centre distance between the seat bone protuberances is practically the same for all people irrespective of bodily build. It is thus possible to form the seat plate so that it is experienced as comfortable for all kinds of people. By the pelvis being positioned on the seat plate, the maintenance of an upright sitting attitude for a long time is facilitated without any particular activation of muscles.

Laterally, the ridges come aginst the insides of the seat bone protuberances. There is thus avoided concentrated load, inter alia, on the sciatic nerves. The forward and rear portions of the seat plate are implemented flat for avoiding concentrated load on muscles and nerves, and the side edges of the seat plate are formed such as to connect onto the remaining implementation of a seat.

Figure 2:
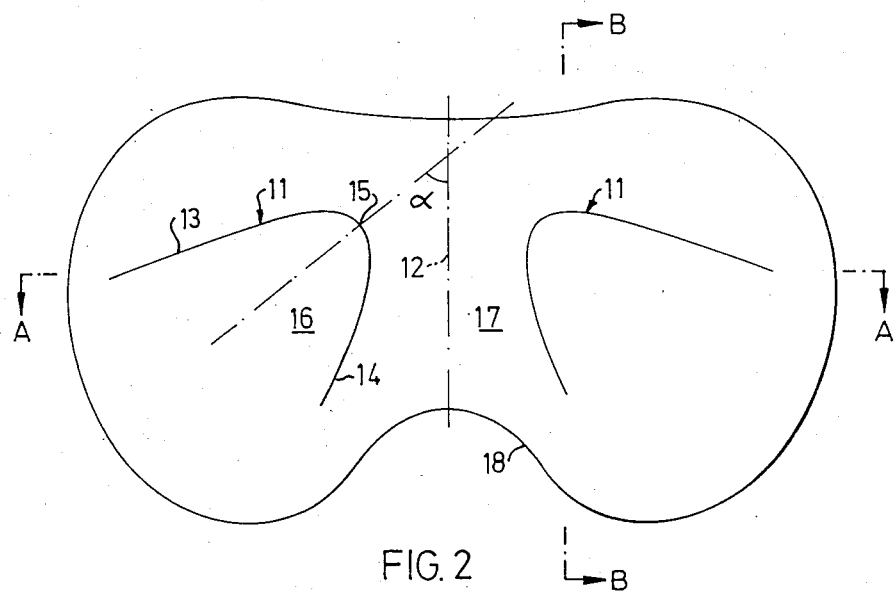
Figure 3:
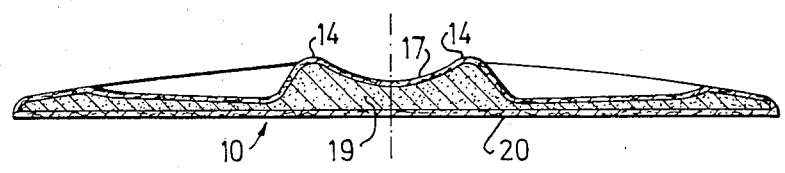
Figure 4:
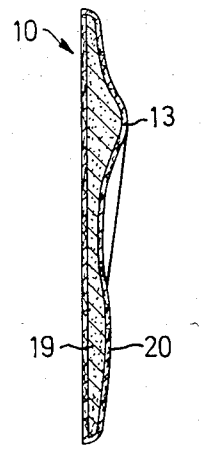

Other distinguishing features of the invention are apparent from the following description of a seat plate exemplifying the invention, the description being carried out with reference to the accompanying drawings, on which FIG. 1 is a longitudinal section of a vehicle seat equipped with an inventive seat plate, FIG. 2 is a view from above of the seat plate, FIG. 3 is a cross section A—A through the seat plate of FIG. 2, and FIG. 4 is a longitudinal section B—B through the seat plate according to FIG. 2.

In a vehicle seat 1, exemplified in FIG. 1, there is included a seat 2 and a back support 4 attached to the sides of the seat with the aid of conventional jointing fittings 3. The base of the seat 2 is a steel frame 5, to which a seat bottom 6 is resiliently attached. A seat pad 7 of elastic material is mounted on the seat bottom 6. The seat pad 7 is preferably moulded from a cold setting polyurethane foamed material and surrounded by a textile cover 8. The underside of the seat pad 7 is formed with a recess 9, which accommodates a separate seat plate 10 formed in accordance with the invention. The recess 9 is formed complemental to the shape of the seat plate 10. Apart from fitting into the shape of the recess 9, the seat plate 10 is located by an adhesive joint (not shown) between the seat plate 10 and the seat pad 7. The underside of the seat plate is flat, and in its fitted position it joins up with the underside of the seat pad 7, which is also flat.

The exemplified seat plate 10 is symmetrically formed relative to a longitudinal centre line 12. The seat plate 10 has a substantially straight front edge, the two side edges of the seat cushion insert 10 being curved and merging with the rear edge which has a central recess 18. The upper side of the seat plate 10 is according to the invention implemented with two raised scythe-shaped ridges 11 symmetrically located about the longitudinal centre line 12. Each of these ridges 11 includes a substantially transverse, forward ridge portion 13, at its innermost end connecting via a curve 15 to a substantially longitudinal ridge portion 14. From the inner curve 15, the transverse ridge portion 13 curves slightly backwards and tapers into the basic plane of the seat plate 10 just before the side edge of the seat plate. The longitudinal ridge portion 14 extends from the inner curve 15, and curves obliquely outwards to taper into the baseplane of the seat plate 10 just before the rear edge of the seat plate 10.

Between the transverse ridge portion 13 and the longitudinal ridge portion 14 there is formed a depression or so-called valley 16, at least in the vicinity of the inner curve 15, the valley having an extension backwards/-outwards and forming an angle α relative the longitudinal symmetrical axis 12. The angle α is preferably about 52°, but other angles between 40° and 60° may also provide an acceptable effect.

A longitudinal depression or valley 17 is also formed between the two longitudinal ridge portions 14, as will be seen from FIG. 3.

In front of and behind the ridge portions 13,14, the seat plate 10 has a substantially flat extension which is thinned out towards the respective edges of the seat plate 10 to give a smooth and uniform junction to the seat pad 7. The nerves and muscles of a person sitting on the seat are thus not subjected to any high pressure loads.

The seat plate 10 is made from a polyurethane foamed material with an interior porous cell structure 19 and an integrated soft homogeneous skin 30 with a thickness of about 1–1.5 mm. The average density of the seat plate 10 is 200–250 kg/m³, while the density of the seat pad 7 is about 55 kg/m³.

The implementation of the seat plate 10 is conditioned by the shape of the pelvis of a person sitting on the seat. The pelvis includes two so-called seat bone protuberances which are the parts of the pelvis which take up the greatest load when a person sits on a completely flat and hard substructure. The centre-to-centre distance between the seat bone protuberances is practically just as great, about 107 mm, for all people, independent of their build. The distance between the scythe-shaped ridges is therefore adjusted so that the seat bone protuberances become positioned in the valleys 16 formed between the different ridge portions 13,14. The transverse ridge portions 13 bear against the forward of the seat bone protuberances, while the longitudinal ridge portions 14 bear against the insides of the seat bone protuberances, resulting in that the pelvis is positioned both longitudinally and transversely.

The rear recess 18 of the seat plate 10 is conditioned by the position of the caudal vertebra varying relative the seat bone protuberances for different persons. The recess 18 allows the caudal vertebra to assume a suitable position without bearing against the seat plate 10.

When a person sits on a seat 2 equipped with a seat plate 10, the seat pad will be compressed so that the person's seat bone protuberances can become positioned on the seat plate 10. The person would probably not particularly notice the seat plate 10 immediately, since its edges merge well with the seat pad 7.

On the other hand, the person would notice that sitting on a seat thus equipped gives greater comfort and less tiredness than before.

The invention is not confined to the exemplified embodiment, but within the scope of the following claims it can be implemented differently as a separate or integrated unit in a seat for a person. The seat plate may also be formed in a material other than the exemplified polyurethane foamed material.

What is claimed is:

1. A seat plate in a seat, for supporting the pelvis of a person sitting on the seat, the seat plate being formed on its upper side with two raised, scythe-like ridges which are symmetrically located about a longitudinal center line, one on each side of the center line, each ridge including a substantially transverse ridge portion which outwardly curves slightly backwards and tapers into a basic plane for the seat plate, each ridge also including a substantially longitudinal ridge portion which backwardly curves slightly outwards and tapers into the basic plane for the seat plate, the ridges being contoured to support the seat bone protuberances of the pelvis substantially on their forward and inner side.

2. A seat plate as in claim 1 wherein each ridge includes an arched curve between the transverse ridge portion and the longitudinal ridge portion.

3. A seat plate as in claim 2 wherein between the transverse ridge portion and the longitudinal ridge portion of each ridge there is formed a depression extending at an oblique angle relative to the longitudinal center line, said angle lying within a range of 40°–60° and preferably being about 52°.

4. A seat plate as in claim 3 wherein the seat plate is provided at its rear edge with an arched recess.

5. A seat plate as in claim 3 wherein the seat plate is manufactured from an elastic material, e.g. polyurethane foamed material, and includes a porous cell structure.

6. A seat plate as in claim 3 wherein the seat plate comprises a separate unit in an elastic seat pad.

7. A seat plate as in claim 6 wherein the seat plate is formed to fit into a complementary recess in the seat pad and together therewith to rest on a fixed seat bottom.

8. A seat plate as in claim 7 wherein the seat plate is formed towards its edges with a thinned-out base plane which accommodatingly joins against the seat pad structure.

* * * * *